United States Patent
Hsieh et al.

(10) Patent No.: US 9,465,707 B2
(45) Date of Patent: Oct. 11, 2016

(54) POST (POWER-ON-SELF-TEST) DEBUGGING METHOD AND APPARATUSES USING THE SAME

(71) Applicant: Wistron Corp., New Taipei (TW)

(72) Inventors: Min Hua Hsieh, New Taipei (TW); Yu Hong Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 80 days.

(21) Appl. No.: 14/587,672

(22) Filed: Dec. 31, 2014

(65) Prior Publication Data

US 2016/0103747 A1  Apr. 14, 2016

(30) Foreign Application Priority Data

Oct. 9, 2014 (TW) .............................. 103135170 A

(51) Int. Cl.
G06F 11/22 (2006.01)
(52) U.S. Cl.
CPC .... G06F 11/2284 (2013.01); *G06F 2011/2278* (2013.01)
(58) Field of Classification Search
USPC .......................................................... 714/36
See application file for complete search history.

(56) References Cited

U.S. PATENT DOCUMENTS

| 5,615,331 A * | 3/1997 | Toorians ............. G06F 11/3664 714/5.11 |
| 8,694,761 B2 | 4/2014 | Zimmer et al. |
| 8,904,182 B2 * | 12/2014 | Bardera Bosch ..... G06F 21/645 713/168 |
| 2007/0011507 A1 * | 1/2007 | Rothman ............. G06F 11/2736 714/718 |
| 2007/0174705 A1 * | 7/2007 | Shih .................... G06F 11/2284 714/36 |
| 2008/0141073 A1 * | 6/2008 | Shih ................... G06F 11/3648 714/36 |
| 2008/0155332 A1 * | 6/2008 | Landers ............... G06F 11/1417 714/36 |
| 2010/0017796 A1 * | 1/2010 | Walker .................. G06F 9/4411 717/174 |
| 2010/0058314 A1 * | 3/2010 | Wang ........................ G06F 8/65 717/168 |
| 2010/0169633 A1 * | 7/2010 | Zimmer ............... G06F 21/575 713/2 |
| 2012/0159254 A1 * | 6/2012 | Su ....................... G06F 11/2284 714/36 |
| 2015/0193620 A1 * | 7/2015 | Khatri .................. G06F 21/575 713/2 |
| 2015/0235030 A1 * | 8/2015 | Chaiken ............... G06F 21/572 726/22 |
| 2015/0278068 A1 * | 10/2015 | Swanson ............. G06F 11/3476 713/2 |
| 2016/0070913 A1 * | 3/2016 | Kulkarni ............... G06F 21/575 713/2 |

FOREIGN PATENT DOCUMENTS

| TW | 201011531 | 3/2010 |
| TW | 201030614 | 8/2010 |
| TW | 201128386 | 8/2011 |

OTHER PUBLICATIONS

Chinese language office action dated Oct. 15, 2014, issued in application No. TW 103135170.
English language translation of relevant paragraphs of office action.

\* cited by examiner

*Primary Examiner* — Kamini Patel
(74) *Attorney, Agent, or Firm* — McClure, Qualey & Rodack, LLP

(57) ABSTRACT

The invention introduces a POST (power-On-Self-Test) debugging method, executed by a processing unit, which contains at least the following steps. A phase number indicative of a current POST phase is set. A driver is selected from a scheduled queue. A GUID (Globally Unique Identifier) of the driver is obtained. The phase number and the GUID are stored or output, so as to recognize the phase of the driver being interrupted upon a break point of the driver. After that, the driver is executed.

16 Claims, 5 Drawing Sheets

POST (POWER-ON-SELF-TEST) DEBUGGING METHOD AND APPARATUSES USING THE SAME

CROSS REFERENCE TO RELATED APPLICATIONS

This Application claims priority of Taiwan Patent Application No. 103135170, filed on Oct. 9, 2014, the entirety of which is incorporated by reference herein.

BACKGROUND

1. Technical Field

The present disclosure relates to debugging technology, and in particular, to POST debugging method and apparatuses using the same.

2. Description of the Related Art

A POST (power-on self-test) is a process performed by firmware or software routines immediately after a computer apparatus is powered on. The results of tests run by the POST may be displayed on a panel that is part of the computer apparatus, output to an external device, or stored for future retrieval by a diagnostic tool. Typically, drivers executed in the POST for hardware initiation are provided by different vendors, such as a BIOS (Basic Input Output System) manufacturer, a chipset manufacturer, an OEM (Original Equipment Manufacturer), etc., and check points are inserted in the drivers by these vendors. However, identification numbers of drivers provided by different vendors may be redundant, leading to a misunderstanding of the interrupted firmware when a check point is reached. Thus, it is desirable to have a POST debugging method and apparatuses using the same to address the aforementioned drawbacks.

BRIEF SUMMARY

An embodiment of the present disclosure introduces a method for debugging in a POST (power-On-Self-Test), executed by a processing unit, which contains at least the following steps. A phase number is set to indicate that a phase of the POST has been entered. A driver is selected from a scheduled queue. A GUID (Globally Unique Identifier) of the driver is obtained. The phase number or the GUID is stored or output, thereby enabling to recognize that the driver of the phase is interrupted when a break point of the driver is to be reached. After that, the driver is executed.

An embodiment of the present disclosure introduces a POST debugging apparatus, which contains at least a volatile memory and a processing unit. The processing unit contains a cache and is coupled to the volatile memory. The processing unit sets a phase number to indicate that a phase of the POST has been entered; selects a driver from a scheduled queue; obtains a GUID of the driver; and stores or outputs the phase number or the GUID, thereby enabling to recognize that the driver of the phase is interrupted when a break point of the driver is to be reached. After that, the processing unit executes the driver.

A detailed description is given in the following embodiments with reference to the accompanying drawings.

BRIEF DESCRIPTION OF THE DRAWINGS

The present disclosure can be fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

The present disclosure will be described with respect to particular embodiments and with reference to certain drawings, but the present disclosure is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
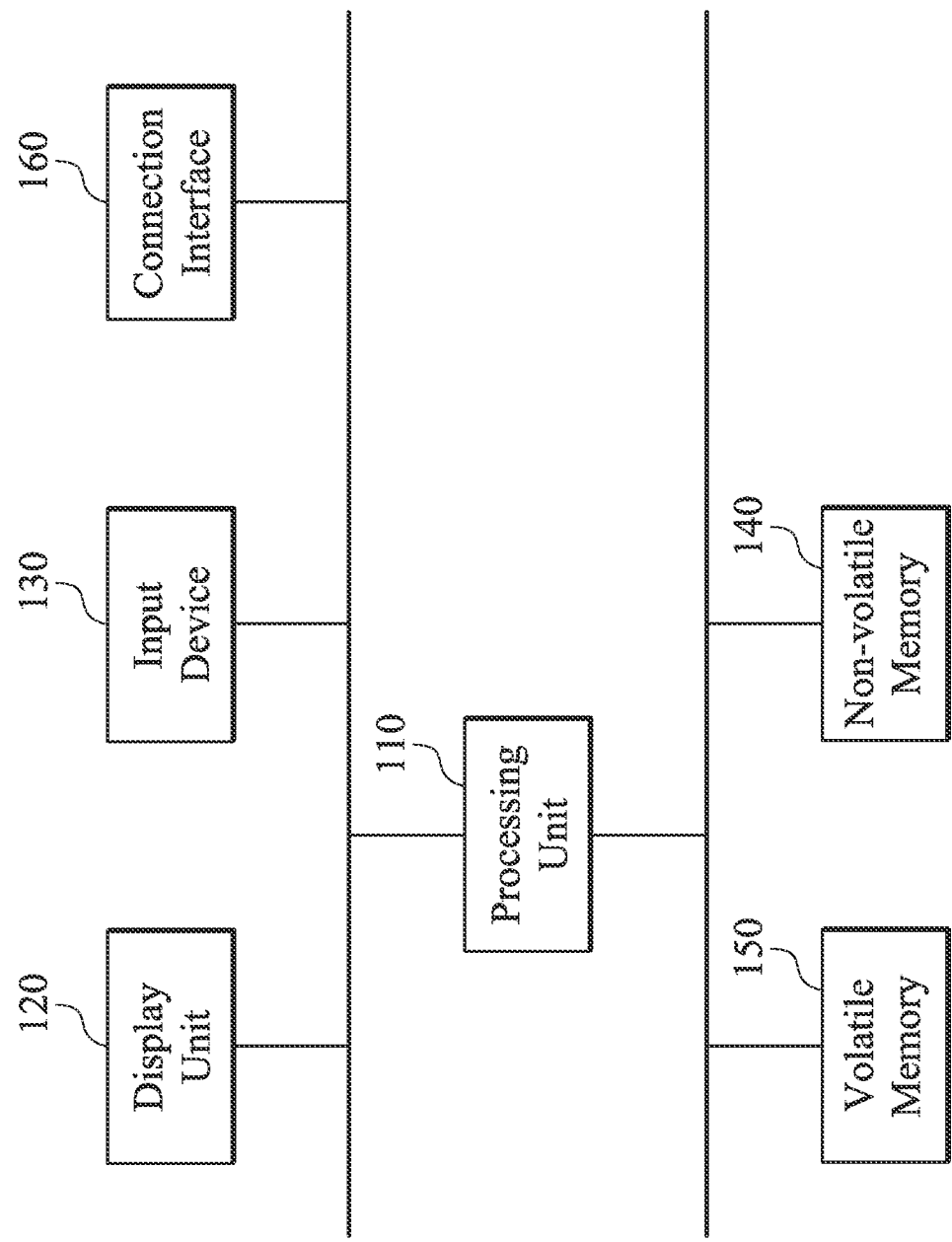
FIG. 1 is the system architecture of a computer apparatus according to an embodiment of the present disclosure.

FIG. 1 is the system architecture of a computer apparatus according to an embodiment of the present disclosure. The system architecture may be practiced in a desktop computer, a notebook computer, a tablet computer, a mobile phone or another electronic apparatus, at least including a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a non-volatile memory 140, such as a ROM (Read Only Memory), a EPROM (Erasable Programmable Read Only Memory), a NVRAM (Non-Volatile Random Access Memory), etc., for storing firmware routines executed for hardware in a POST, which are provided by different vendors; a volatile memory 150, such as a DRAM (Dynamic Random Access Memory), for storing necessary data in execution, such as variables, data tables, or others, and a register 170 for storing GUIDs (Globally Unique Identifiers) associated with the currently executed driver and the last executed driver. It should be understood that the non-volatile memory 140 and/or the register 170 may be integrated into the processing unit 110, and the present disclosure should not be limited thereto. The system architecture further includes a connection interface 160, thereby enabling the processing unit 110 to communicate with another electronic apparatus. The connection interface 160 may be a USB (Universal Serial Bus) interface, a COM (Communication) interface, or others. The system architecture further includes one or more input devices 130 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 120, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for a user to view.

Figure 2:
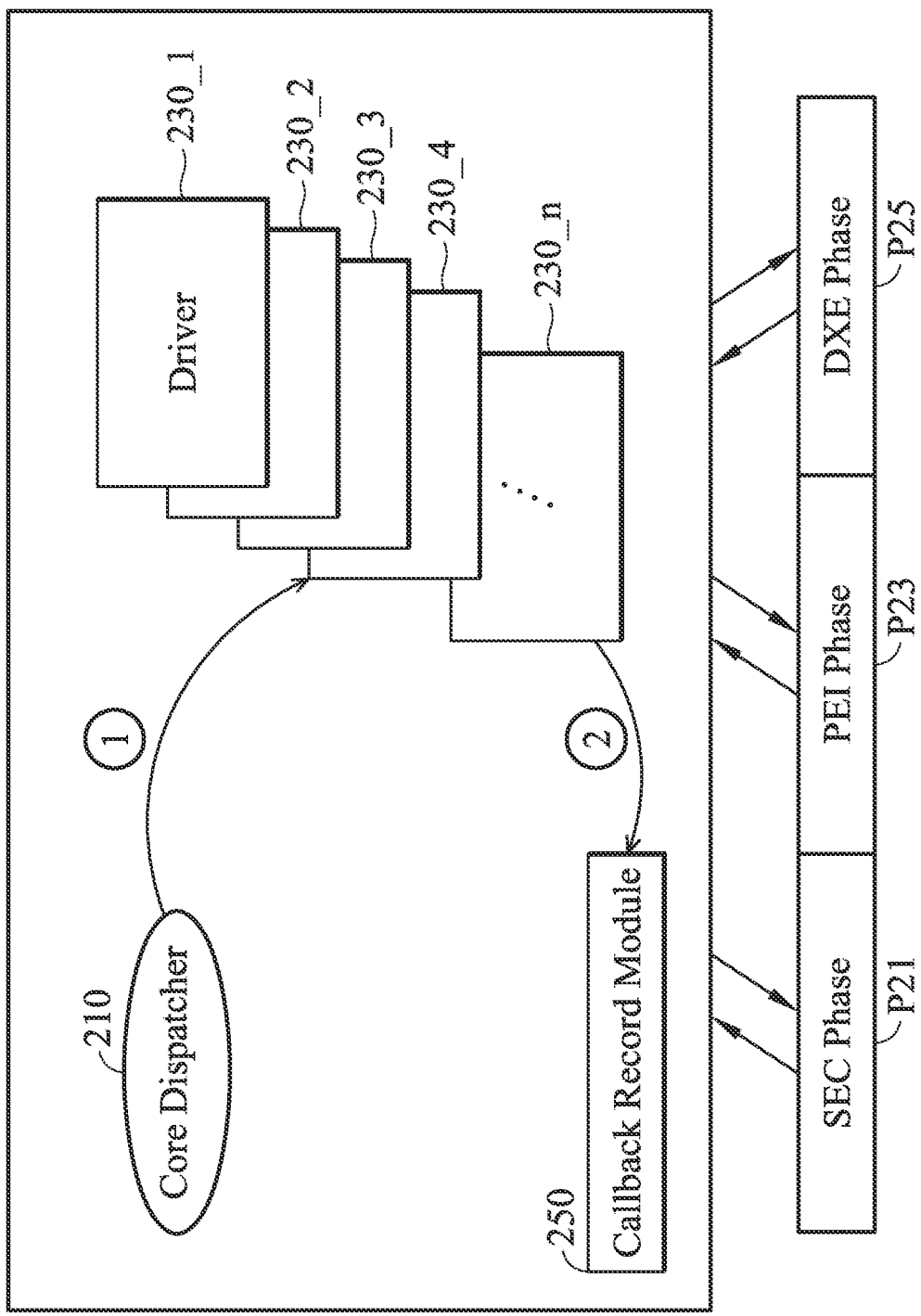
FIG. 2 is a schematic diagram illustrating a POST (power-on self-test) according to an embodiment of the present disclosure.

FIG. 2 is a schematic diagram illustrating a POST (power-on self-test) according to an embodiment of the present disclosure. The POST contains at least three phases: a SEC (SECurity) phase P21; a PEI (PreExtensible-firmware-interface Initialization) phase P23; and a DXE (Driver Execution Environment) phase P25. These three phases are referred to as a platform initialization collectively, and in each phase, a particular core dispatcher is used to coordinate with all hardware initializations. At the beginning of each phase, the processing unit 110 loads and executes the core dispatcher 210 of this phase. The processing unit 110, when executing the core dispatcher 210, selects a driver from a scheduled queue and stores it in a cache (not shown) of the processing unit 110 or the volatile memory 150, such as one of the drivers 230_1 to 230_n, where n is an integer greater than 0 (the operation is also referred to as loading a driver). Each driver has a GUID. GUIDs are unique reference numbers used as identifiers of the drivers 230_1 to 230_n. GUIDs may be stored as 128-bit values, and displayed as 32 hexadecimal digits with groups separated by hyphens, such as {21 EC2020-3AEA-4069-A2DD-08002B30309D}. After loading a driver, the processing unit 110 further calls and executes a callback record module 250. When executing the callback record module 250, the processing unit 110 may store or output this phase number and the GUID of this driver. In an example, the processing unit 110 may store this phase number and the GUID of this driver in the non-volatile memory 140. In another example, the processing unit 110 may store this phase number and the GUID of this driver in a register of port 80, enabling the phase number and the GUID of the driver to be displayed in the display unit 120. In still another example, the processing unit 110 may store this phase number and the GUID of this driver in a register of the connection interface 160, enabling the phase number and the GUID of the driver to be output to another electronic apparatus. After executing the callback record module 250, the processing unit 110 starts to fetch and execute the stored instructions of the driver to finish an initialization for specific hardware. Next, the processing unit 110 repeatedly executes the core dispatcher 210 to load the next driver from the scheduled queue, call and execute the callback record module 250, and execute the loaded driver until all drivers of this phase are executed completely. It should be noted that, when any break point is reached, a user may recognize which driver of a particular phase breaks by viewing information of the display unit 120, obtaining the updated output phase number and GUID via the connection interface 160 or reading the updated phase number and GUID from the volatile memory 150.

Figure 3:
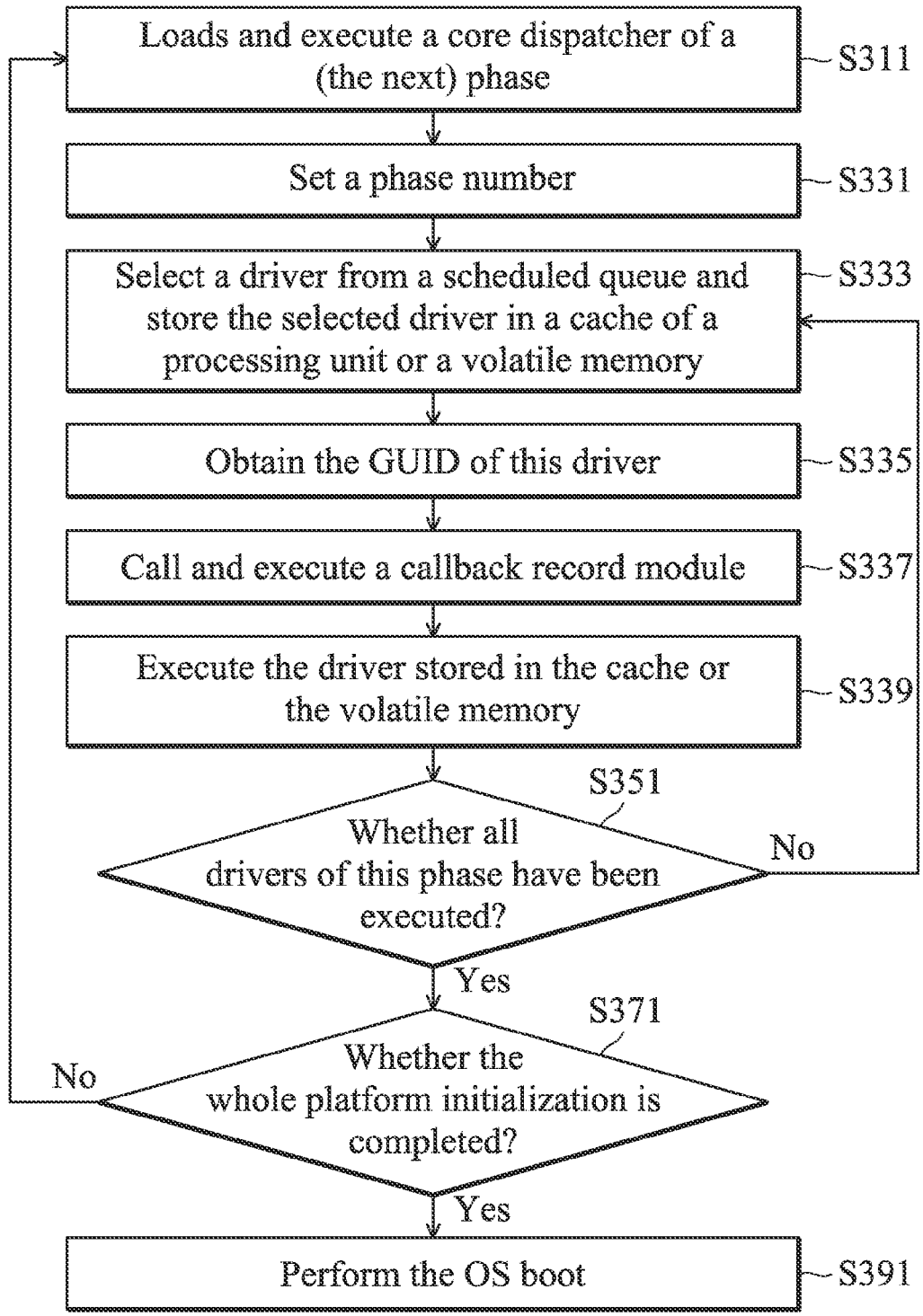
FIG. 3 is a flowchart illustrating a method for debugging in a POST according to an embodiment of the present disclosure.
Figure 4:
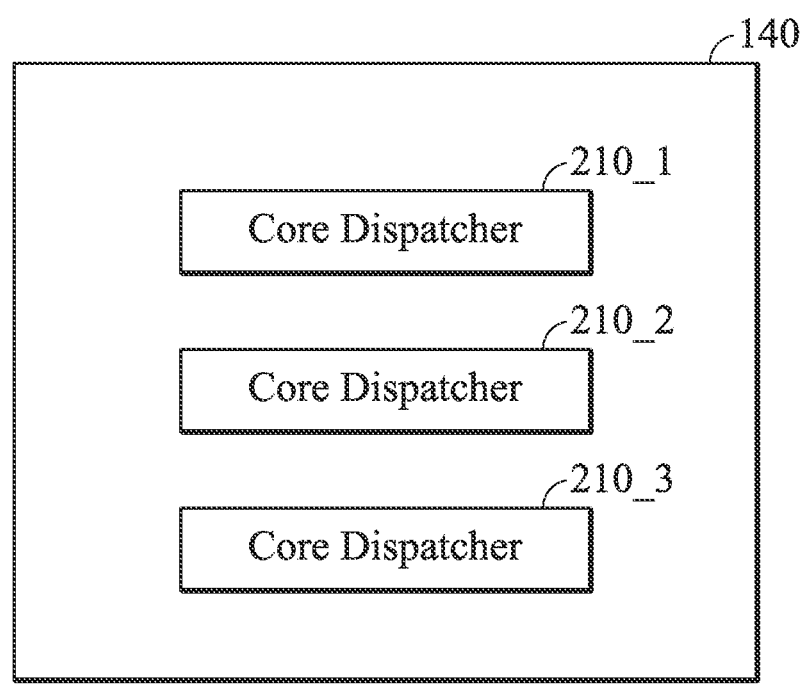
FIG. 4 is a schematic diagram illustrating the storage of core dispatchers according to an embodiment of the present disclosure.

FIG. 3 is a flowchart illustrating a POST debugging method according to an embodiment of the present disclosure. The method is performed when the processing unit 110 loads and executes relevant firmware routines. The process repeatedly loads and executes a core dispatcher of a (the next) phase until the whole platform is initialized completely (step S311), and under the control of the core-dispatcher, completes necessary hardware initialization tasks of this phase (steps SD31 to S371). FIG. 4 is a schematic diagram illustrating the storage of core dispatchers according to an embodiment of the present disclosure. The non-volatile memory 140 stores three core dispatchers 210_1 to 210_3 when being executed by the processing unit 110 to manage relevant hardware initialization in the SEC phase P21, the PEI phase P23 and the DXE phase P25, respectively. Under the control of the designated core dispatcher, the processing unit 110 first sets a phase number (step S331). For example, when the core dispatcher 210_1 is executed, the variable "Progress Code" is set to "01" to indicate that the SEC phase P21 has been entered; when the core dispatcher 210_2 is executed, the variable "Progress Code" is set to "02" to indicate that the PEI phase P23 has been entered; and when the core dispatcher 210_3 is executed, the variable "Progress Code" is set to "03" to indicate that the DXE phase P21 has been entered. Then, the processing unit 110 repeatedly performs a loop (steps S333 to S371) until all relevant hardware initialization of this phase is complete. Specifically, the processing unit 110 selects a driver from the scheduled queue and stores the selected driver in a cache (not shown) of the processing unit 110 or the volatile memory 150 (step S333), obtains the GUID of this driver (step S335), calls and executes the callback record module 250 (step S337), executes the driver stored in the cache (not shown) or the volatile memory 150 (step S339) and determines whether all drivers of this phase have been executed (step S351). If so, the process proceeds to the next determination (step S371); otherwise, the process continues to select the next driver from the scheduled queue to do the subsequent process (step S333). In step S333, when the cache of the processing unit 110 has been initialized but the volatile memory 150 has not been initialized, the driver may be stored in the cache of the processing unit 110. Alternatively, when the volatile memory 150 has been initialized, the driver may be stored in the volatile memory 150. In step S337, when the callback record module 250 is executed, the processing unit 110 may store or output the phase number and the GUID of this driver. It should be noted that, after the callback record module 250 is executed completely, the execution control is returned to the core dispatcher to continue the operation of step S339. In step S339, after the driver is executed completely, the execution control is returned to the core dispatcher to continue the determination of step S351.

After all drivers of this phase are executed completely (the "Yes" path of step S351), it is determined whether the whole platform initialization is complete, that is, whether the aforementioned three phases P21, P23 and P25 are completed (step S371). If so, the processing unit 110 performs the OS (Operating System) boot (step S391); otherwise, the processing unit 110 loads and executes the core dispatcher of the next phase to continue hardware initialization of the next phase (step S311).

Figure 5:
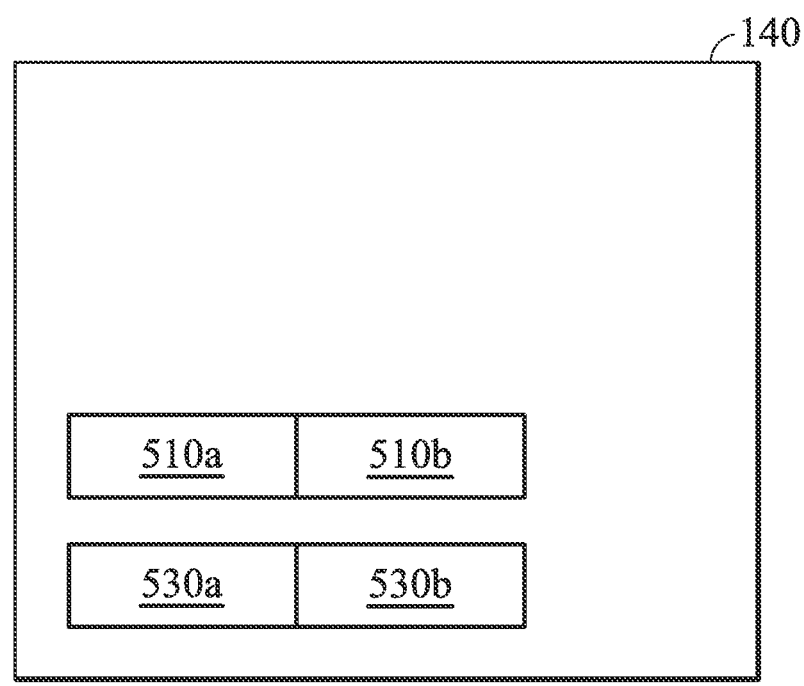
FIG. 5 is a schematic diagram illustrating the storage of phase numbers and GUIDs of drivers according to an embodiment of the present disclosure.

After the break point of a driver is reached, the user may reboot the whole system, therefore, the core dispatcher is re-executed. Before the driver is interrupted, in step S337, the processing unit 110 stores a phase number and a GUID of this driver in the non-volatile memory 140. The re-executed core dispatcher may overwrite the phase number and the GUID of the driver, which are stored before the interruption, with the newly obtained phase number and the GUID of the currently executed driver. In order to avoid the aforementioned problem, the reboot procedure may contain a step for duplicating the phase number and the GUID of the driver, which are stored before an interruption, in a new location of the non-volatile memory 140. FIG. 5 is a schematic diagram illustrating the storage of phase numbers and GUIDs of drivers according to an embodiment of the present disclosure. A region 510a of the non-volatile memory 140 stores the newly obtained phase number and a region 510b of the non-volatile memory 140 stores the newly obtained GUID representing a driver. When the reboot procedure is executed, the processing unit 110 duplicates the values of the regions 510a and 510b of the non-volatile memory 140 (that is, the phase number and the GUID representing a driver, which are stored before an interruption) in the regions 530a and 530b of the non-volatile memory 140.

Although the embodiment has been described as having specific elements in FIG. 1, it is noted that additional elements may be included to achieve better performance without departing from the spirit of the present disclosure. While the process flow described in FIG. 3 includes a number of operations that appear to occur in a specific order, it should be apparent that these processes can include more or fewer operations, which can be executed serially or in parallel (e.g., using parallel processors or a multi-threading environment).

While the present disclosure has been described by way of example and in terms of the preferred embodiments, it should be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A POST (power-On-Self-Test) debugging method, executed by a processing unit, comprising:
    setting a phase number indicative of a current POST phase;
    selecting a driver from a scheduled queue;
    obtaining a GUID (Globally Unique Identifier) of the driver;
    storing or outputting the phase number and the GUID so as to recognize the driver of the phase being interrupted upon a break point of the driver; and
    executing the driver,
    wherein the step of selecting a driver from a scheduled queue comprises:
    selecting the driver from the scheduled queue and storing the driver in a cache of the processing unit when the cache of the processing unit has been initialized but a volatile memory has not been initialized; and
    selecting the driver from the scheduled queue and storing the driver in the volatile memory when the volatile memory has been initialized.

2. The method of claim 1, wherein the volatile memory is a DRAM (Dynamic Random Access Memory).

3. The method of claim 1, wherein the phase number is indicative of a SEC (SECurity) phase, a PEI (PreExtensible-firmware-interface Initialization) phase, or a DXE (Driver Execution Environment) phase.

4. The method of claim 1, wherein the GUID is stored as 128-bit values indicative of an unique identifier of the driver.

5. The method of claim 1, wherein the step of storing or outputting the phase number or the GUID comprises:
    storing the phase number and the GUID in a register having a port equaling to 80 so as to display the phase number and the GUID by a display unit.

6. The method of claim 1, wherein the step of storing or outputting the phase number or the GUID comprises:
    storing the phase number and the GUID in a register of a connection interface so as to output the phase number and the GUID to an electronic apparatus.

7. The method of claim 6, wherein the connection interface is an USB (Universal Serial Bus) interface or a COM (Communication) interface.

8. The method of claim 1, wherein the step of storing or outputting the phase number or the GUID comprises:
    storing the phase number and the GUID in a non-volatile memory.

9. An POST (power-On-Self-Test) debugging apparatus, comprising:
    a volatile memory; and
    a processing unit comprising a cache, coupled to the volatile memory, setting a phase number indicative of a current POST phase; selecting a driver from a scheduled queue; obtaining a GUID (Globally Unique Identifier) of the driver; storing or outputting the phase number and the GUID, so as to recognize the driver of the phase being interrupted upon a break point of the driver; and executing the driver,
    wherein the processing unit selects the driver from the scheduled queue and stores the driver in the cache of the processing unit when the cache of the processing unit has been initialized but the volatile memory has not been initialized; and selects the driver from the scheduled queue and stores the driver in the volatile memory when the volatile memory has been initialized.

10. The apparatus of claim 9, wherein the volatile memory is a DRAM (Dynamic Random Access Memory).

11. The apparatus of claim 9, wherein the phase number is indicative of a SEC (SECurity) phase, a PEI (PreExtensible-firmware-interface Initialization) phase, or a DXE (Driver Execution Environment) phase.

12. The apparatus of claim 9, wherein the GUID is stored as 128-bit values indicative of a unique identifier of the driver.

13. The apparatus of claim 9, comprising:
    a display unit,
    wherein the processing unit stores the phase number and the GUID in a register having a port equaling to port 80 so as to display the phase number and the GUID by the display unit.

14. The apparatus of claim 9, comprising:
    a connection interface,
    wherein the processing unit stores the phase number and the GUID in a register of the connection interface, so as to output the phase number and the GUID to an electronic apparatus.

15. The apparatus of claim 14, wherein the connection interface is a USB (Universal Serial Bus) interface or a COM (Communication) interface.

16. The apparatus of claim 9, comprising:
a non-volatile memory,
wherein the processing unit stores the phase number and the GUID in the non-volatile memory.

* * * * *